(12) United States Patent
Kwon

(10) Patent No.: US 12,002,475 B2
(45) Date of Patent: Jun. 4, 2024

(54) ELECTRONIC DEVICE PERFORMING SPEAKER RECOGNITION AND CONTROL METHOD THEREOF

(71) Applicant: SAMSUNG ELECTRONICS CO., LTD., Suwon-si (KR)

(72) Inventor: Jaesung Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 520 days.

(21) Appl. No.: 17/284,653

(22) PCT Filed: Sep. 27, 2019

(86) PCT No.: PCT/KR2019/012642
§ 371 (c)(1),
(2) Date: Apr. 12, 2021

(87) PCT Pub. No.: WO2020/075998
PCT Pub. Date: Apr. 16, 2020

(65) Prior Publication Data
US 2021/0398544 A1 Dec. 23, 2021

(30) Foreign Application Priority Data
Oct. 12, 2018 (KR) .......... 10-2018-0122052

(51) Int. Cl.
*G10L 17/22* (2013.01)
*G06F 21/32* (2013.01)
*G10L 17/02* (2013.01)

(52) U.S. Cl.
CPC .......... *G10L 17/22* (2013.01); *G06F 21/32* (2013.01); *G10L 17/02* (2013.01)

(58) Field of Classification Search
CPC .......... G10L 17/22; G10L 17/02; G06F 21/32
(Continued)

(56) References Cited

U.S. PATENT DOCUMENTS

| 5,517,558 A | * | 5/1996 | Schalk ................ H04M 3/382 |
| | | | 379/189 |
| 5,897,616 A | | 4/1999 | Kanevsky et al. |

(Continued)

FOREIGN PATENT DOCUMENTS

| KR | 10-2011-0128229 A | 11/2011 |
| KR | 10-2014-0079092 A | 6/2014 |

(Continued)

OTHER PUBLICATIONS

Young Mi Lee et al, "An Utterance Analysis of Conversations and Picture Description Tasks of Korean Adults", Jul. 30, 2001, 12 pages total.

(Continued)

*Primary Examiner* — Susan I McFadden
(74) *Attorney, Agent, or Firm* — Sughrue Mion, PLLC

(57) ABSTRACT

The present disclosure provides an electronic device and a control method thereof. The electronic device of the present disclosure includes: a memory in which a speaker model including acoustic characteristics and context information of a first user voice is stored; and a processor for comparing a degree of similarity between the acoustic characteristics of the first user included in the speaker model and the acoustic characteristics of a second user voice, with a threshold value changing according to a degree of similarity between the context information included in the speaker model and the context information of the second user voice, and then performing authentication on the second user voice.

13 Claims, 9 Drawing Sheets

(58) Field of Classification Search
USPC .......................................................... 704/246
See application file for complete search history.

(56) References Cited

U.S. PATENT DOCUMENTS

| | | | |
|---|---|---|---|
| 8,719,023 | B2 | 5/2014 | Menendez-Pidal et al. |
| 9,336,781 | B2 | 5/2016 | Scheffer et al. |
| 9,343,068 | B2 | 5/2016 | Yun et al. |
| 9,384,738 | B2 | 7/2016 | Foerster et al. |
| 9,756,161 | B2 | 9/2017 | Bang |
| 9,799,334 | B2 | 10/2017 | Lee |
| 9,837,080 | B2 * | 12/2017 | Aronowitz ............. G10L 17/06 |
| 9,940,933 | B2 | 4/2018 | Choi et al. |
| 10,102,359 | B2 * | 10/2018 | Cheyer .................. H04L 63/10 |
| 10,347,237 | B2 * | 7/2019 | Tachibana ............... G10L 13/00 |
| 10,636,420 | B2 * | 4/2020 | Kang ...................... G10L 17/02 |
| 10,789,959 | B2 * | 9/2020 | Kajarekar ............... G10L 17/06 |
| 11,145,303 | B2 * | 10/2021 | Kwon ..................... G10L 15/22 |
| 11,176,946 | B2 | 11/2021 | Choi et al. |
| 11,322,159 | B2 * | 5/2022 | Horton .................... G10L 17/06 |
| 11,430,449 | B2 * | 8/2022 | Grancharov ............ G10L 17/22 |
| 2011/0288869 | A1 | 11/2011 | Menendez-Pidal et al. |
| 2014/0172428 | A1 | 6/2014 | Han |
| 2016/0155436 | A1 | 6/2016 | Choi et al. |
| 2018/0047389 | A1 | 2/2018 | Song et al. |
| 2018/0061412 | A1 | 3/2018 | Cho et al. |
| 2018/0226078 | A1 | 8/2018 | Choi et al. |
| 2018/0293989 | A1 | 10/2018 | De et al. |
| 2021/0134302 | A1 * | 5/2021 | Kwon ..................... G10L 17/06 |

FOREIGN PATENT DOCUMENTS

| | | |
|---|---|---|
| KR | 10-2015-0107520 A | 9/2015 |
| KR | 10-2016-0023424 A | 3/2016 |
| KR | 10-2016-0066441 A | 6/2016 |
| KR | 10-2016-0073747 A | 6/2016 |
| KR | 10-2016-0105496 A | 9/2016 |
| KR | 10-2018-0011361 A | 1/2018 |
| KR | 10-2018-0018031 A | 2/2018 |
| KR | 10-2018-0024807 A | 3/2018 |
| KR | 10-1868711 B1 | 6/2018 |
| WO | 2015/199813 A1 | 12/2015 |

OTHER PUBLICATIONS

Chul Hwan Lee, "A Study on the Enhancement of the Phoneme-based Hidden Markov Modeling", Collection @ mokpo, 1995, 59 pages total.
International Search Report dated Jan. 20, 2020 issued by the International Searching Authority in counterpart International Application No. PCT/KR2019/012642 (PCT/ISA/210).
International Written Opinion dated Jan. 20, 2020 issued by the International Searching Authority in counterpart International Application No. PCT/KR2019/012642 (PCT/ISA/237).
Communication dated Jun. 9, 2023 by the Korean Intellectual Property Office in counterpart Korean Patent Application No. 10-2018-0122052.
Communication dated Sep. 27, 2023 issued by the Korean Intellectual Property Office in counterpart Korean Application No. 10-2018-0122052.

* cited by examiner

FIG. 1A
1000
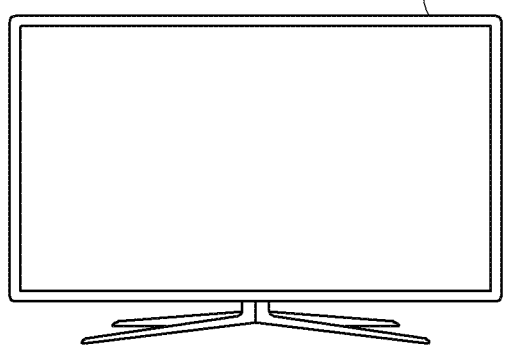
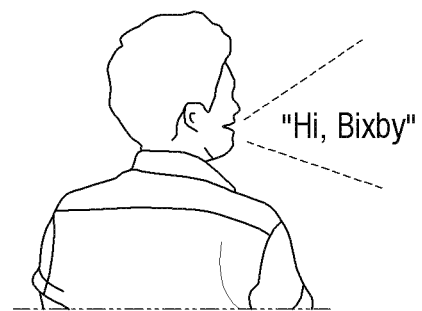
"Hi, Bixby"

ELECTRONIC DEVICE PERFORMING SPEAKER RECOGNITION AND CONTROL METHOD THEREOF

TECHNICAL FIELD

The disclosure relates to an electronic device and a control method thereof. More particularly, the disclosure relates to an electronic device performing speaker recognition and a control method thereof.

BACKGROUND ART

With wireless communication technology becoming more common according to the development of electronic technology, security techniques for preventing hacking or private information leakage are being developed. Recently, biometric recognition technology authenticating a user by using a part of a body of the user such as fingerprint, iris, face, voice, or the like is emerging.

With the increase of electronic devices performing functions by receiving user voice as commands due to recent developments in voice recognition technology and artificial intelligence technology, interest in electronic devices configured to perform functions for only authenticated users through voice is also increasing.

In this regard, speaker recognition refers to a technology of authenticating a user by using features included in the uttered voice of the user. The speaker recognition may include a registration step of registering a specific voice by the utterance of the user and an authentication step of authenticating a speaker by comparing a voice uttered by the user after registration with a registered specific voice.

The speaker recognition may generate a speaker model with an acoustic features of a uttered (registered utterance) voice at the registration step, and compare the acoustic features of the voice uttered at the registration step included in the speaker model and the acoustic features of the voice uttered (verified utterance) in the authentication step at the authentication step and identify that the speaker of the registered utterance and the speaker of the verified utterance is the same based on a comparison result being greater than or equal to a specific threshold value.

The speaker recognition may be largely divided into a text-dependent method of authenticating a speaker by uttering the same voice as the voice registered in the registration step and a text-independent method of authenticating a speaker by freely uttering a voice regardless of the registered voice based on the authentication step.

In the case of the text-dependent speaker recognition method, because the electronic device uses a same utterance word in the authentication step as in the registration step, accuracy in speaker recognition of the electronic device may be high, but utilization from an usability aspect may be low in terms of using only a specific utterance word.

Meanwhile, in the case of the text-independent speaker recognition method, utilization may be high in terms of the electronic device freely recognizing the uttered voice by the user, but because in most cases verified utterances different from the registered utterances are made, there is the disadvantage of having low performance in speaker recognition compared to the text-dependent method.

DISCLOSURE

Technical Problem

Aspects of the disclosure are to address at least the above-mentioned problems and/or disadvantages and to provide at least the advantages described below. Accordingly, an aspect of the disclosure is to provide an electronic device which performs text-independent speaker recognition by using similarities of a registered utterance in a registration step and a verified utterance in an authentication step and a control method thereof.

Technical Solution

According to an embodiment of the disclosure, an electronic device includes a memory configured to store a speaker model including acoustic features and context information of a first user voice; and a processor configured to compare a similarity between acoustic features of the first user voice included in the speaker model and acoustic features of a second user voice with a threshold value changing according to a similarity between context information included in the speaker model and context information of the second user voice, and perform an authentication on the second user voice.

The threshold value may be identified to be proportionate to a similarity between the context information of the second user voice and the context information included in the speaker model.

The processor may be configured to calculate the threshold value based on a similarity between the context information of the second user voice and the context information included in the speaker model, and compare the calculated threshold value with a similarity between acoustic features of the second user voice and acoustic features of the first user voice stored in the speaker model.

The processor may be configured to calculate the threshold value based on a maximum possible value of the similarity between the acoustic features of the first user voice and the acoustic features of the second user voice based on the context information of the first user voice and the context information of the second user voice being the same.

The processor may be configured to identify that, based on the similarity between the acoustic features of the second user voice and the acoustic features of the first user voice stored in the speaker model being greater than or equal to the threshold value, an authentication on the second user voice is successful.

The processor may be configured to obtain, based on the first user voice being received, acoustic features and context information of the first user voice from the first user voice, and store the speaker model including the obtained acoustic features and context information in the memory.

The processor may be configured to select one context information type from among a predefined plurality of context information types, use the selected context information type to obtain the context information of the first user voice, and store the obtained context information in the memory.

The processor may be configured to identify a similarity between the acoustic features of the first user voice and the acoustic features of a plurality of test voices respectively, identify a similarity between the context information of the first user voice and the context information of the respective test voices by type of the plurality of context information, and select, from among a plurality of context information types, a context information type in which a distribution of similarity of the determined acoustic features with respect to similarity between the identified context information satisfies a pre-set condition.

The processor may be configured to analyze the second user voice, use the selected context information type to obtain context information of the second user voice, and identify the threshold value based on the similarity between the context information of the second user voice and the context information included in the speaker model.

According to an embodiment of the disclosure, a control method of an electronic device includes storing a speaker model including acoustic features and context information of a first user voice; comparing a similarity between acoustic features of the first user voice included in the speaker model and acoustic features of a second user voice with a threshold value changing according to a similarity between context information included in the speaker model and context information of the second user voice; and performing an authentication on the second user voice.

The threshold value may be identified to be proportionate to a similarity between context information of the second user voice and context information included in the speaker model.

The comparing may include calculating the threshold value based on a similarity between context information of the second user voice and context information included in the speaker model, and comparing the calculated threshold value with a similarity between acoustic features of the second user voice and acoustic features of the first user voice stored in the speaker model.

The calculating may include calculating the threshold value based on a maximum possible value of the similarity between the acoustic features of the first user voice and the acoustic features of the second user voice based on context information of the first user voice and the context information of the second user voice being the same.

The performing the authentication may include identifying that, based on a similarity between acoustic features of the second user voice and acoustic features of the first user voice stored in the speaker model being greater than or equal to the threshold value, an authentication on the second user voice is successful.

The performing the authentication may include identifying that, based on a similarity between acoustic features of the second user voice and acoustic features of the first user voice stored in the speaker model being greater than or equal to the threshold value, an authentication on the second user voice is successful. Further, based on the first user voice being received, obtaining acoustic features and context information of the first user voice from the first user voice; and storing the speaker model including the obtained acoustic features and context information may be further included.

The obtaining may include selecting one context information type from among a pre-defined plurality of context information types; and using the selected context information type to obtain context information of the first user voice.

The selecting may include identifying a similarity between acoustic features of the first user voice and acoustic features of the respective test voices; identifying a similarity between context information of the first user voice and context information of the respective test voices by type of the plurality of context information; and selecting, from among the plurality of context information types, a context information type in which a distribution of similarity of the identified acoustic features with respect to similarity between the identified context information satisfies a pre-set condition.

Lastly, analyzing the second user voice and using the selected context information type to obtain context information of the second user voice; and identifying the threshold value based on a similarity between context information of the second user voice and context information included in the speaker model may be further included.

Effect of Invention

According to an embodiment as described above, because the electronic device may variably change a threshold value according to a similarity between a user voice stored in a speaker model and an input user voice, usability of a speaker recognition system may be increased.

DESCRIPTION OF DRAWINGS

FIGS. 1A-1D are a diagram illustrating a dialogue system according to various embodiments of the disclosure;

BEST MODE OF EXEMPLARY EMBODIMENTS

DETAILED DESCRIPTION OF EXEMPLARY EMBODIMENTS

Figure 1B:
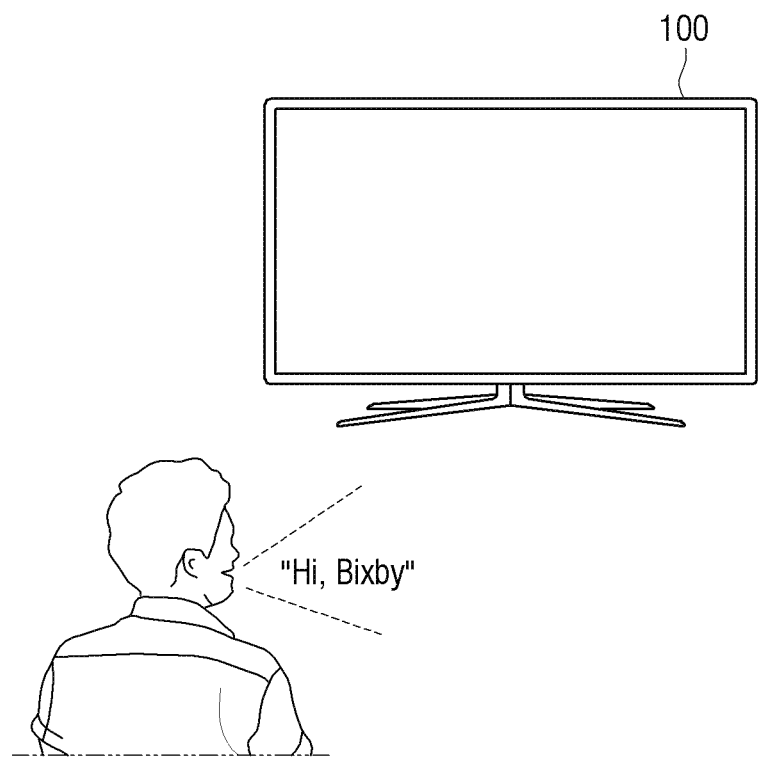

Terms used in the disclosure will be briefly described, and the disclosure will be described in detail.

The terms used in the embodiments of the disclosure are general terms identified in consideration of the functions in the disclosure. However, these terms may vary depending on intention, legal or technical interpretation, emergence of new technologies, and the like of those skilled in the related art. Also, there may be some terms arbitrarily identified by an applicant, and in this case the meaning thereof will be described in detail in the description part of the corresponding disclosure. Accordingly, the terms used herein may be construed, not simply by their designations, but based on the meaning of the term and the overall content of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing embodiments, detailed description of related known technologies may unnecessarily confuse the gist of the disclosure, the detailed description will be omitted.

Terms such as "first," and "second" may be used in describing the various elements, but the elements are not to be limited by the terms. The terms may be used only to distinguish one element from another.

A singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other features, numbers, steps, operations, elements, components or a combination thereof.

The terms "module" or "part" used in the embodiments herein perform at least one function or operation, and may be implemented as a hardware or software, or a combination of hardware and software. Further, a plurality of "modules" or a plurality of "parts", except for a "module" or a "part" which needs to be implemented to a specific hardware, may be integrated to at least one module and implemented in at least one processor (not shown).

Example embodiments of the disclosure will be described in detail with reference to the accompanying drawings to aid in the understanding of those of ordinary skill in the art. However, the disclosure may be realized in various different forms and it should be noted that the disclosure is not limited to the various example embodiments described herein. Further, in the drawings, parts not relevant to the description may be omitted, and like reference numerals may be used to indicate like elements.

The various embodiments of the disclosure will be described in detail below with reference to the accompanied drawings.

FIGS. 1A-1D are a diagram illustrating a dialogue system according to various embodiments of the disclosure.

As illustrated in FIG. 1A, the dialogue system 1000 may include an electronic device 100 and a display device 200.

The electronic device 100 may receive a user voice, and perform voice recognition on the received user voice. Specifically, the electronic device 100 may perform a pre-processing on the received user voice, convert the user voice to text (speech-to-text, STT) by performing a voice recognition on the user voice, and identify an intent and an entity of the user voice based on the voice recognition results.

To this end, the electronic device 100 may include an automatic speech recognition (ASR) module, a natural language understanding (NLU) module, a dialogue management (DM) module, a natural language generation (NLG) module, and the like.

The electronic device 100 may perform voice recognition on the received user voice and convert the user voice to text, but the electronic device 100 may also perform a pre-processing on the received user voice and convert the user voice to a voice signal, and transmit the user voice signal to a server (not shown).

The server (not shown) may perform voice recognition on the received user voice signal to perform the STT function of converting the user voice to text, and transmit the voice recognition result on the user voice to the electronic device 100.

The electronic device 100 may obtain information for response on the user voice based on a result of natural language understanding from, for example, a web server, or the like, and generate a response information on the user voice based on the obtained information.

The electronic device 100 may transmit the generated response information to the display device 200.

The display device 200 may provide a response on the user voice based on the received response information.

For example, the display device 200 may, through text-to-speech (TTS), convert the text included in the received response information to voice and output through the speaker of the display device 200, or display a user interface including the corresponding text through a display of the display device 200.

Meanwhile, the electronic device 100 may store an artificial intelligence agent for operating a dialogue system. Specifically, the electronic device 100 may use an artificial intelligence agent for generating a natural language as a response on the user voice. The artificial intelligence agent may, as a dedicated program for providing artificial intelligence (AI) based services (e.g., voice recognition service, personal assistant service, translation service, search service, etc.), be executed by a generic-use processor (e.g., CPU) according to related art or a separate AI dedicated processor (e.g., GPU, etc.). Specifically, the artificial intelligence agent may be configured to control various modules.

In this case, the electronic device 100 may transmit response information on the user voice generated in the natural language to the display device 200, and the display device 200 may be able to provide the user with the response information by outputting in the natural language.

Accordingly, the dialogue system 1000 may be configured to provide a response on the user voice, and the user may be able to perform a dialogue with the display device 200.

Although the electronic device 100 and the display device 200 have been illustrated separately in FIG. 1A, the electronic device 100 and the display device 200 may be implemented within one device as in FIG. 1B.

In this case, the electronic device 100 may receive the user voice, and perform voice recognition on the received user voice to provide response information on the user voice.

To this end, the electronic device 100 may include a display, a speaker, and the like for providing response information on the user voice.

As in FIG. 1B, based on the electronic device 100 and the display device 200 being implemented in one device, the electronic device 100 may be connected with a server (not shown) and may convert the received user voice to a voice signal, and then transmit the voice signal to the server (not shown). The server (not shown) may perform the STT function of converting the user voice signal to text and transmit the voice recognition result to the electronic device 100.

Figure 1C:
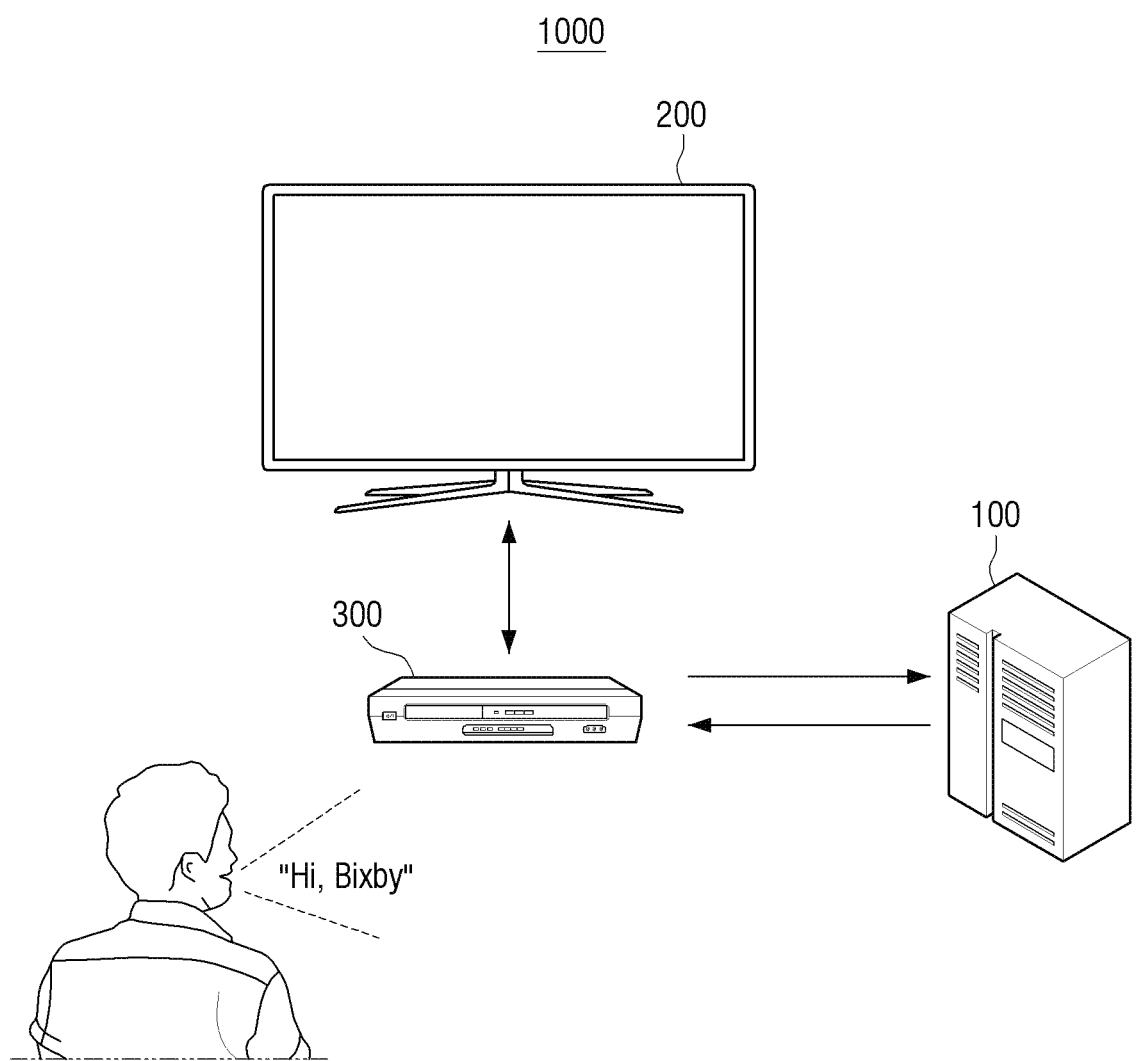

Meanwhile, as illustrated in FIG. 1C, the electronic device may be implemented as a server.

In this case, an external electronic device 300 may receive a voice uttered by the user, convert the received user voice to a voice signal, and transmit the voice signal to the electronic device 100.

The electronic device 10 may, based on receiving the user voice from the external electronic device 300, perform voice recognition on the received user voice. Specifically, the electronic device 100 may convert the user voice signal to text, perform a natural language understanding processing on the user voice, and identify the intent and the entity of the user voice.

The electronic device 100 may obtain information for a response on the user voice based on the natural language understanding results from another server such as a web server, and generate response information on the user voice based on the obtained information.

The electronic device 100 may transmit the generated response information to the external electronic device 300.

The external electronic device 300 may be connected with the display device 200 by wire and wireless method and may transmit the response information received from the electronic device 100 to the display device 200. Because the description on the display device 200 providing the response information overlaps with FIG. 1A, specific descriptions thereof will be omitted.

Figure 1D:
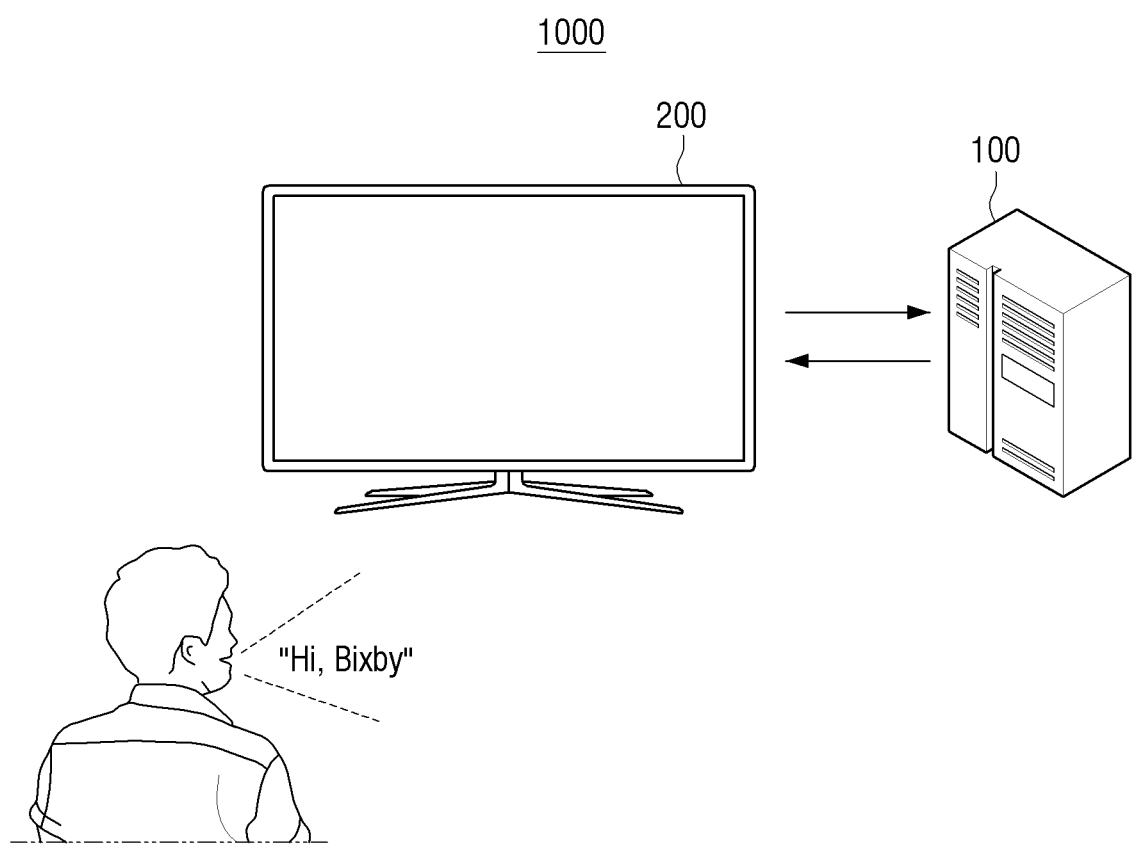

Meanwhile, the external electronic device 300 and the display device 200 have been illustrated separately in FIG. 1C, but like FIG. 1D, the function of the external electronic device 300 and the function of the display device 200 may be implemented in one device.

As in FIG. 1D, the electronic device 100 may be implemented as a server, and based on the function of the external electronic device 300 and the function of the display device 200 being implemented in one device, the display device 200 may receive the user voice by being connected to the electronic device 100, convert the received user voice to a voice signal, and then transmit the converted voice signal to the electronic device 100.

The electronic device 100 may perform voice recognition on the user voice received from the display device 200, and generate response information on the user voice.

Specifically, the electronic device 100 may convert the user voice signal to text, and perform the natural language understanding processing on the user voice to identify the intent and the entity of the user voice. Then, the electronic device 100 may obtain information for a response on the user voice based on the natural language understanding results from another server such as a web server, and generate response information on the user voice based on the obtained information.

The electronic device 100 may transmit the generated response information to the display device 200, and the display device 200 may provide the response information to the user, or perform an operation according to the response information.

Although FIGS. 1A to 1D illustrate the user inputting voice directly to the electronic device 100, the user may also input the user voice to a remote control device (not shown).

In this case, the remote control device (not shown) may convert the received user voice (analog signal) to a digital signal, and transmit the converted user voice signal to the electronic device 100 through wireless communication such as Bluetooth.

Meanwhile, in order for the electronic device 100 according to an embodiment of the disclosure to provide the voice recognition function, a speaker verification is required with respect to a speaker uttering a voice.

The speaker verification may refer to the technology of identifying whether the speaker who uttered the voice has the authority to access a secure electronic device or content by comparing the features included in the speaker voice with the features of a pre-stored voice.

According to an embodiment of the disclosure, the electronic device 100 may generate and store acoustic features of a first user voice and a speaker model including context information. Then, when a second user voice is received, the electronic device 100 may compare the similarity between the acoustic features of the first user voice included in the speaker model and the acoustic features of the second user voice with a threshold value changing according to the similarity between context information of the first user voice included in the speaker model and context information of the second user voice to perform speaker verification on the second user voice.

According to various embodiments of the disclosure, there is the advantage that the threshold value on identifying acoustic feature similarity of the second user voice may be adjusted according to the similarity of the context information of the second user voice and the context information included in the speaker model in that the threshold value on the similarity between the first and second acoustic features is determined using the similarity in context information of the second user voice with the context information included in the speaker model.

The method of performing speaker verification according to the various embodiments of the disclosure will be described in detail below.

Figure 2:
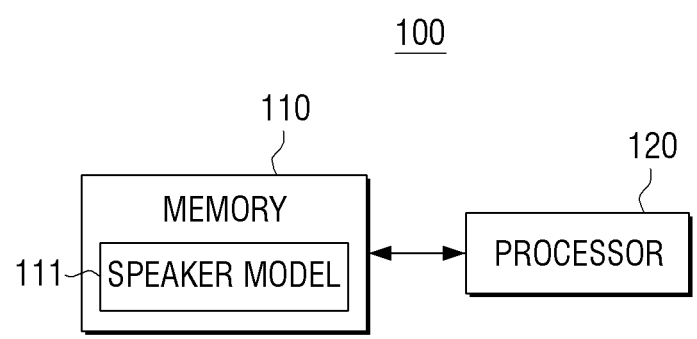
FIG. 2 is a block diagram illustrating a configuration of an electronic device according to an embodiment of the disclosure.

FIG. 2 is a block diagram illustrating a configuration of an electronic device according to an embodiment of the disclosure.

Referring to FIG. 2, the electronic device 100 may include a memory 110 and a processor 120.

The memory 110 may be configured to store various programs, data, and the like necessary in the operation of the electronic device 100.

Specifically, the memory 110 may store a speaker model including the acoustic features and context information of the first user voice.

The acoustic features of the first user voice may include spectrum features representing a distribution per frequency of the first user voice or prosody features representing pitch, volume, speed, rhythm, intensity, and the like of the first user voice.

Meanwhile, context information of the first user voice may include at least one from among position information of phonemes, position information of syllables, position information of words, phoneme information (Uniphone, Triphone, Quinphone), information on number of phonemes, syllable information, and word information included in the first user voice.

The above-described context information is one embodiment, and other context information may be added according to the system.

The processor 120 may be electrically connected with the memory 110 and configured to control the overall operations and functions of the electronic device 100.

The processor 120 may be configured to control a microphone to generate a voice signal by processing the received user voice. Specifically, the processor 120 may be configured to perform signal processing such as analog/digital conversion, filtering, compression, encryption, and the like on the user voice and control the microphone to generate a voice signal.

The processor 120 may be configured to obtain the acoustic features from the voice signal. Specifically, the processor 120 may be configured to obtain acoustic features such as frequency, pitch, volume, speed, rhythm, and intensity of the user voice from the voice signal.

The processor 120 may be configured to obtain context information from the voice signal. The processor 120 may be configured to perform voice recognition on the voice signal to obtain the context information. The processor 120 may be configured to use an ASR engine to convert the user voice signal to text, and use an NLU engine to perform natural language processing such as morpheme analysis, syntax analysis, semantic analysis, or the like on the user voice.

Meanwhile, the processor 120 may be configured to transmit the user voice signal rather than converting the user voice signal to text data to the server (not shown). In this case, the server (not shown) may be a STT server performing only the speech-to-text (STT) function, or a server performing not only the STT function on the user voice signal but also natural language processing. Based on the server (not shown) being the STT server, the server (not shown) may convert the user voice signal to text and then transmit the converted text to another server again to perform natural language processing or the like on the converted user voice.

The processor 120 may be configured to obtain the acoustic features from the voice signal prior to performing the voice recognition, and perform voice recognition on the voice data. However, the embodiment is not necessarily limited thereto, and the processor 120 may be configured to obtain the acoustic features from the voice signal while concurrently obtain context information by using a voice recognition engine, a natural language processing engine, or the like.

The processor 120 may perform authentication on the speaker by using a speaker model 111 stored in the memory 110.

For the authentication of the speaker, first, the processor 120 may be configured to register the speaker. In this case, because the speaker verification is performed by comparing the acoustic features of the user voice with the acoustic features included in the speaker model pre-stored in the electronic device 100, the registering of the speaker may be understood as generating the speaker model.

The processor 120 may be configured to obtain, based on receiving the first user voice, the acoustic features and context information with respect to the first user voice from the first user voice, and store the speaker model including the obtained acoustic features and the context information in the memory 110.

Figure 4:
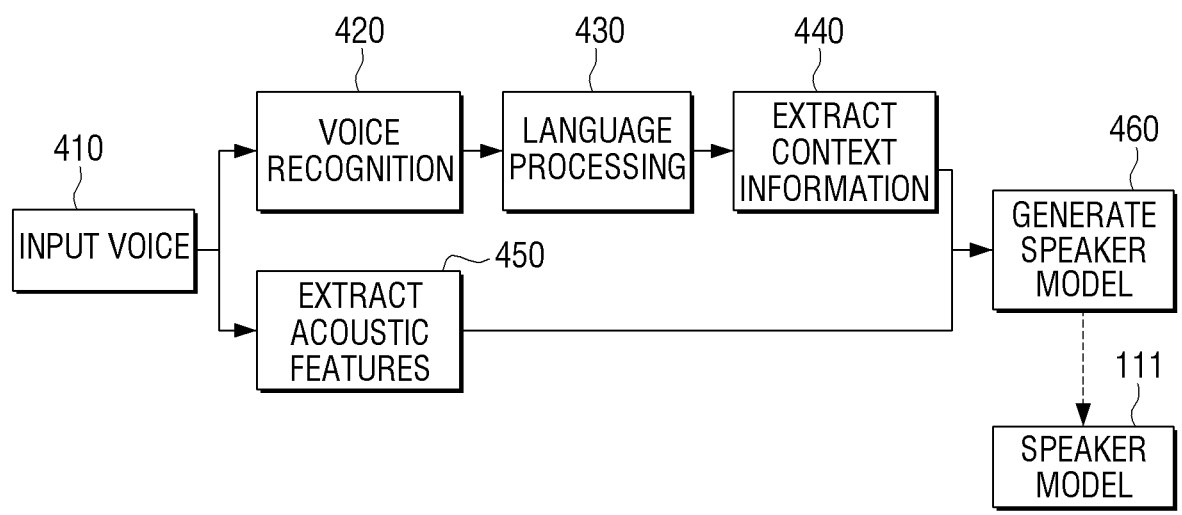
FIGS. 4 and 5 are diagrams illustrating an electronic device according to an embodiment of the disclosure.

The method of generating the speaker model will be described below with reference to FIG. 4.

First, the processor 120 may be configured to obtain, based on receiving the first user voice (410), the acoustic features with respect to the first user voice.

Specifically, the processor 120 may be configured to analyze the first user voice in a time domain and a frequency domain, and obtain the acoustic features with respect to the first user voice such as spectrum, volume, speed, rhythm, intensity, and the like of the first user voice (450).

In addition, the processor 120 may be configured to obtain, based on receiving the first user voice (410), context information with respect to the first user voice.

Specifically, the processor 120 may be configured to perform voice recognition on the first user voice by using the voice recognition module stored in the memory 110 (420). That is, the processor 120 may perform voice recognition on the first user voice and convert the first user voice to text (speech-to-text, STT).

Then, the processor 120 may be configured to use the natural language processing module to perform natural language processing of the voice recognition result of the first user voice (430). Specifically, the processor 120 may be configured to perform morpheme analysis, syntax analysis, semantic analysis, or the like on the first user voice which is converted to text through the natural language processing process.

Then, the processor 120 may be configured to use the natural language processed first user voice to obtain context information from the first user voice (440).

For example, the context information of the first user voice may include at least one from among phoneme information, position information of phonemes, information on a number of phonemes, position information of syllables, and position information of words in the first user voice.

Here, the position information of phonemes may show an order in which phonemes are positioned based on a word or a sentence, the position information of syllables may show an order in which syllables are positioned based on a word or a sentence, and the position information of words may show an order in which words are positioned based on a sentence. Further, the information on the number of phonemes may show the number of phonemes present in a word or a sentence. In addition, phoneme information may include Uniphone information which shows current phoneme information, Triphone information which shows information on the current phoneme and phonemes present prior to and subsequent to the current phoneme (that is, information on prior phoneme—current phoneme—subsequent phoneme), and Quinphone information which shows information on the current phoneme and phonemes present consecutively by two prior to and subsequent to the present phoneme (that is, phoneme before to the prior phoneme—prior phoneme—current phoneme—subsequent phoneme—phoneme following the subsequent phoneme).

For example, the user voice may be "sun." In this case, the Uniphone information may be Uniphone(s)="s", Uniphone (u)="u", Uniphone(n)="n" in that the current phoneme is represented. In addition, the Triphone information may be Triphone(s)="- s u", Triphone(u)="s u n", Triphone(n)= "u n -" in that the current phoneme and the phonemes present prior to and subsequent to the current phoneme are represented. Further, Quinphone information may be Quinphone(s)="-- s u n", Quinphone(u)="-s u n -", Quinphone(n)="s u n --" in that the current phoneme and phonemes present consecutively by two prior to and subsequent to the present phoneme are represented.

The processor 120 may be configured to select context information of a specific type from among the pre-defined plurality of context information types, and obtain context information of a selected type from the first user voice.

That is, as described above, the context information may be comprised of various types such as phoneme information, position information of phonemes, information on the number of phonemes, position information of syllables, and position information of words. In this case, the processor 120 may be configured to select one context information from among the pre-defined plurality of context information types, and use the selected context information type to obtain the context information of the first user voice.

To this end, the processor 120 may be configured to identify the similarity between the acoustic features of the first user voice and the acoustic features of the respective test voices and the similarity between the context information of the first user voice and the context information of the respective test voices by type of the predefined plurality of context information.

Here, the plurality of vest voices may be obtained from the speaker who uttered the first user voice, and may also be obtained by using a database including the plurality of user voices.

First, the processor 120 may identify the similarity between the acoustic features of the first user voice and the acoustic features of the respective test voices.

Specifically, the processor 120 may be configured to compare the spectrum features or the prosody features of the plurality of test voices included in the respective test voices with the spectrum features or the prosody features of the first user voice to identify the degree of similarity in spectrum, pitch, volume, speed, rhythm, intensity, and the like of the respective test voices with respect to the first user voice, and calculate a score corresponding to the degree of similarity.

In addition, the processor 120 may be configured to identify the similarity between the context information of the first user voice and the context information of the respective plurality of test voices by type of the pre-defined plurality of context information.

To this end, the processor 120 may obtain context information on the respective type from the first user voice and the respective test voices by type of the pre-defined plurality of context information.

Then, the processor 120 may be configured to compare the context information obtained from the first user voice with the context information obtained from the respective test voices, and identify the similarity between these context information.

In this case, the processor 120 may be configured to identify the similarity based on Equation 1 below.

$$S(A, B) = \frac{|A \cap B|}{|B|} \quad [\text{Equation 1}]$$

Here, A represents to the context information of the first user voice, and B represents the context information of the test voice.

For example, the first user voice being 'sun,' the test voice being 'sing,' and the context information type using current phoneme information, that is uniphone information, from among the plurality of context information types described above in FIG. 2 may be assumed.

In this case, based on phonemes being identified based on pronunciations, the uniphone of 'sun' may be "s", "u", "n", the uniphone of 'sing' may be "s", "i", "ng", and these in binary notation may be as shown in Table 1 below.

TABLE 1

|              | sun | sing |
|--------------|-----|------|
| uniphone (s) | 1   | 1    |
| uniphone (u) | 1   | 0    |
| uniphone (n) | 1   | 0    |
| uniphone (i) | 0   | 1    |
| uniphone (ng)| 0   | 1    |

Specifically, because the phoneme s is included in 'sun' and 'sing,' values of the uniphone (s) of A and the uniphone (s) of B are all 1. Although the phonemes u and n are included in 'sun,' but not included in 'sing,' the value of the uniphone (u) and the uniphone (n) of A is 1, and the value of the uniphone (u) and the uniphone (n) of B is 0. In addition, although the phonemes i and ng are included in 'sing,' but not included in 'sun,' the value of the uniphone (i) and the uniphone (ng) of A is 0, and the value of the uniphone (i) and the uniphone (ng) of B is 1. Here, $|A \cap B|=1$ in that phoneme s is common, and $|B|=3$ in that there are 3 phonemes of test voice B.

Accordingly, in Equation 1, it may be understood that $S(A,B)=\frac{1}{3}$.

According to another embodiment, a triphone may be used as a context information type. In this case, information on the triphone of the first user voice 'sun' and the test voice 'sing' may be shown as in Table 2 below.

TABLE 2

|              | sun   | sing   |
|--------------|-------|--------|
| triphone (s) | - s n | - s i  |
| triphone (u) | s u n | 0      |
| triphone (n) | u n - | 0      |
| triphone (i) | 0     | s i n  |
| triphone (ng)| 0     | i ng - |

That is, in the case of triphone (x), based on at least two or more phonemes being the same from among 'prior phoneme of phoneme x—current phoneme x—subsequent phoneme of phoneme x' of the first and test voices, the triphone (x) of the first user voice and the test voice may be denoted as 1. For example, in the case of triphone (x) in Table 2, because there is no case in which at least two or more phonemes are the same from among 'prior phoneme of phoneme x—current phoneme x—subsequent phoneme of phoneme x' of the first user voice and the test voice, the similarity value of the first user voice and the test voice may be 0.

Meanwhile, this is merely one embodiment, and identifying the similarity may vary according to circumstance. For example, in the case of triphone (x), based on at least one or more phonemes being the same from among 'prior phoneme of phoneme x—current phoneme x—subsequent phoneme of phoneme x' of the first user voice and the test voice, the triphone (x) of the first user voice and the test voice may be denoted as 1.

In this case, because the phoneme s is the same in triphone (s)="- s n" of the first user voice and triphone(s)="- s i" of the test voice, the triphone (s) of the first user voice and the test voice may be represented as 1 in a binary notation. In this case, the similarity of the first user voice and the test voice may be understood as $S(A, B)=\frac{1}{3}$.

Meanwhile, the equation for identifying the similarity between the context information of the first user voice and the context information of the test voice is not limited to Equation 1, various identification methods may be used according to the various embodiments. For example, measures such as a jaccard similarity measure, and a cosine similarity measure used in the natural language processing method may be used in identifying the similarity.

Meanwhile, the processor 120 may be configured to select a context information type in which distribution of a similarity between test context information with respect to a similarity between test acoustic features satisfies a pre-set condition by type of the pre-defined plurality of context information.

For example, the processor 120 may be configured to select a context information type in which the distribution of the test context information similarity with respect to the test acoustic feature similarity exhibits linearity.

For example, the first user voice may be 'sun,' and the test voice may be 'drum,' 'sing' and 'son.' In this case, the similarity between the acoustic features of 'sun' and the acoustic features of 'drum,' 'sing' and 'son' with respect to the similarity of the acoustic features may be 0.3, 0.5, and 0.8, respectively.

Further, the similarity between the context information of 'sun' and the context information of 'drum,' 'sing' and 'son' when using the context information of A type may be 0.2, 0.8 and 0.6, and the similarity between the context information of 'sun' and the context information of 'drum,' 'sing' and 'son' when using the context information of B type may be 0.2, 0.6, and 0.8.

At this time, the context information type in which the distribution of the test context information similarity with respect to the test acoustic feature similarity exhibits linearity may be context information of the B type, and the processor 120 may be configured to select the context information of the B type.

Accordingly, the processor 120 may be configured to obtain the context information from the first user voice (440).

Then, the processor 120 may be configured to generate the speaker model 111 including the obtained context information and the acoustic features.

When the speaker model 111 is generated and stored in the memory 110, the speaker registration step may be completed.

Meanwhile, the processor 120 may be configured to perform, based on using the speaker model, an authentication on the speaker.

Figure 5:
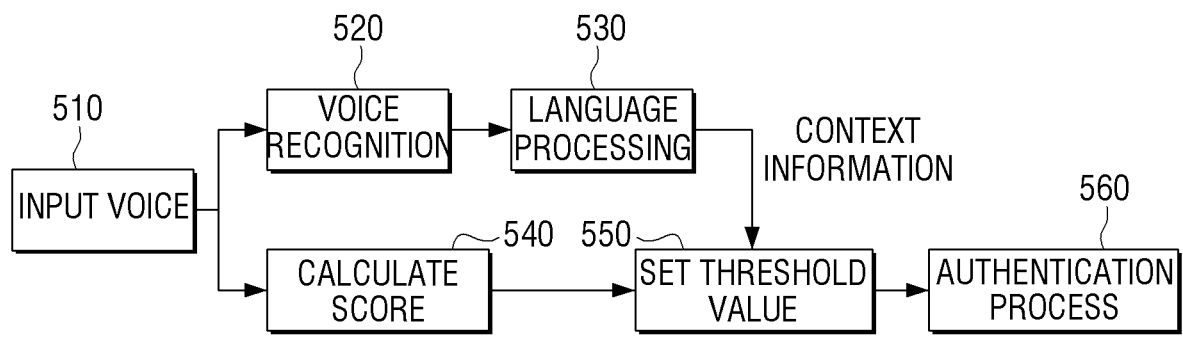

FIG. 5 is a diagram illustrating an electronic device according to an embodiment of the disclosure, and in particular, a diagram illustrating an electronic device 100 performing speaker verification.

The processor 120 may be configured to use, based on the second user voice being received (510), the acoustic features of the second user voice to calculate a score with respect to the speaker model of the second user voice (540).

Here, the score with respect to the speaker model of the second user voice may be a value representing the similarity between the acoustic features of the second user voice and the acoustic features of the first user voice stored in the speaker model. In this regard, because the method of identifying the similarity between the acoustic features of the second user voice and the acoustic features of the first user voice stored in the speaker model is the same as the method of identifying the similarity between the acoustic features of the first user voice and the acoustic features of the plurality of test voices described above in FIG. 4, the detailed description thereof will be omitted.

Then, the processor 120 may be configured to compare the similarity between the acoustic features of the second user voice and the acoustic features of the first user voice stored in the speaker model 111 with the threshold value.

The threshold value may be calculated based on the similarity between the context information of the second user voice and the context information included in the speaker model 111 (550).

Meanwhile, the method of calculating the threshold value will be described in detail below.

First, in order to calculate the threshold value, the processor 120 may be configured to use the voice recognition module stored in the memory 110 to perform voice recognition with respect to the second user voice (520). That is, the processor 120 may be configured to perform voice recognition on the second user voice, and convert the first user voice to text (speech-to-text, STT).

Then, the processor 120 may be configured to use the voice recognition module to perform natural language processing of the voice recognition result of the second user voice (530). Specifically, the processor 120 may be configured to perform morpheme analysis, syntax analysis, semantic analysis, or the like on the first user voice which is converted to text through the natural language processing process.

The processor 120 may be configured to use the natural language processed second user voice to generate the context information of the second user voice.

The processor 120 may be configured to generate the context information of the second user voice taking into consideration the context information of the first user voice included in the speaker model 111. For example, assuming that the context information of the first user voice included in the speaker model 111 has been generated by using the context information of the Uniphone type, the processor 120 may be configured to generate the context information of the second user voice to the context information of the Uniphone type taking into consideration the context information of the first user voice stored in the speaker model.

Then, the processor 120 may be configured to identify the similarity of the second user context information and the first user context information stored in the speaker model. Because the method of identifying the similarity between the context information of the second user voice and the context information of the first user voice stored in the speaker model is the same as the method of identifying the similarity between of context information of the first user voice and the context information of the plurality of test voices described above in FIG. 4, the detailed description thereof will be omitted.

Meanwhile, the processor 120 may be configured to calculate the threshold value based on the similarity between the context information of the second user voice and the context information included in the speaker model 111.

Specifically, the processor 120 may be configured to calculate the threshold value based on a maximum possible value of the similarity between the first and second acoustic features based on the similarity between the context information of the second user voice and the context information included in the speaker model, and the context information of the first user voice and the context information of the second user voice being the same.

In this case, the threshold value may be identified to be proportionate to the similarity between the context information of the second user voice and the context information included in the speaker model.

For example, the processor 120 may be configured to calculate the threshold value by using the equation below.

$$Th(S(A,B)) W \times S(A,B) \times \text{Max\_score}$$

【Equation 2】

Here, Th(S(A,B)) represents the threshold value on the similarity in context information of the first user voice with the context information of the second user voice, and S(A,B) represents the similarity in first user context information with the second user context information. Max_score represents the maximum possible value of similarity between the acoustic features of the first and second user voices based on the context information of the first user voice included in the speaker model and the context information of the second user voice being the same. In addition, w represents a pre-set weight value.

For example, based on the first user voice being 'sun' and the second user voice being 'gun,' the context information of the second user voice and the context information of the first user voice included in the speaker model may be represented as below in a binary notation.

TABLE 3

|  | sun | sing |
|---|---|---|
| uniphone (s) | 1 | 0 |
| uniphone (u) | 1 | 1 |
| uniphone (n) | 1 | 1 |
| uniphone (g) | 0 | 1 |

At this time, similarity S(A,B) of the context information of the second user voice and the context information of the first user voice included in the speaker model may be represented as ⅔ using Equation (2). Further, based on w and Max_score being a pre-set value, it may be understood that threshold value (Th(S(A,B))) is identified to be proportionate to similarity(S(A,B)) between the context information of the second user voice and the first user context information included in the speaker model. That is, based on the similarity between the second user context information and the context information included in the speaker model decreasing, the threshold value may also be lowered.

Meanwhile, Equation 2 above is an equation according to an embodiment of the disclosure, and the threshold value may be identified to be inversely proportionate to the similarity between the context information of the second user voice and the context information included in the speaker model if necessary. That is, the threshold value may be calculated by applying an equation as below.

$$Th(S(A, B)) = W \times \frac{1}{S(A, B)} \times \text{Max\_score} \quad \text{[Equation 3]}$$

As with Equation 2, Th(S(A,B)) represents the threshold value on the similarity of the context information of the first user voice and the context information of the second user voice, S(A,B) represents the similarity of the first user context information and the second user context information, and Max_score represents the maximum possible value of similarity between the acoustic features of the first and second user voices based on the context information of the first user voice included in the speaker model and the context information of the second user voice being the same.

For example, based on the first user voice being 'sun,' and the second using voice being 'gun,' similarity S(A,B) of the context information of the second user voice and the context information of the first user voice included in the speaker model may be represented as ⅔ by using Table 2 and Equation 2 above.

Further, based on w and Max_score being a pre-set value, it may be understood that threshold value (Th(S(A,B))) is identified to be inversely proportionate to similarity(S(A,B)) between the context information of the second user voice and the first user context information included in the speaker model. That is, based on the similarity between the second user context information and the context information included in the speaker model being decreased, the threshold value may in contrast become higher.

Meanwhile, the embodiment of Equation 2 and Equation 3 above is an embodiment of the disclosure, and the processor 120 may be configured to set the threshold value as a pre-set value (second value) when the similarity between the context information of the first user voice included in the speaker model 111 and the context information of the second user voice is less than or equal to a pre-set value (first value).

For example, the processor 120 may be configured to set, based on the similarity between the context information of the first user voice included in the speaker model 111 and the context information of the second user voice being less than or equal to 0.5, the threshold value to 1.

In contrast, the processor 120 may be configured to set, based on the similarity between the context information of the first user voice included in the speaker model 111 and the context information of the second user voice being greater than or equal to a pre-set value (first value), the threshold value to a pre-set value (second value).

For example, the processor 120 may be configured to set, based on the similarity between the context information of the first user voice included in the speaker model 111 and the context information of the second user voice being greater than or equal to 0.09, the threshold value to 0.5.

The processor 120 may be configured to compare the threshold value calculated as described above with the similarity between the acoustic features of the second user voice and the acoustic features of the first user voice stored in the speaker model to perform the authentication on the speaker who uttered the second user voice (560).

Specifically, the processor 120 may be configured to identify that, based on the similarity between the acoustic features of the second user voice and the acoustic features of the first user voice stored in the speaker model 111 being greater than or equal to the threshold value, the authentication on the speaker is successful.

For example, the first user voice (A) may be 'sun,' and the second user voice (B) may be 'gun,' and it may be understood that S(A,B)=⅔≈0.66.

In this case, threshold value Th(S(A,B)) may be calculated to have different values from each other according to Equation 2 and Equation 3 above or a setting method, and the processor 120 may be configured to identify that, based on the similarity between the acoustic features of the second user voice and the acoustic features of the speaker model having a value greater than or equal to the calculated threshold value, the authentication on the speaker who uttered the second user is successful.

Based on the authentication being identified as successful, the processor 120 may be configured to allow access of the speaker who uttered the second user voice and provide secure content.

On the other hand, based on the authentication not being identified as successful due to the similarity between the acoustic features of the second user voice and the acoustic features of the speaker model having a value less than the calculated threshold value, the processor 120 may be configured to limit access of the speaker who uttered the second user voice and not provide the secure content.

Figure 3:
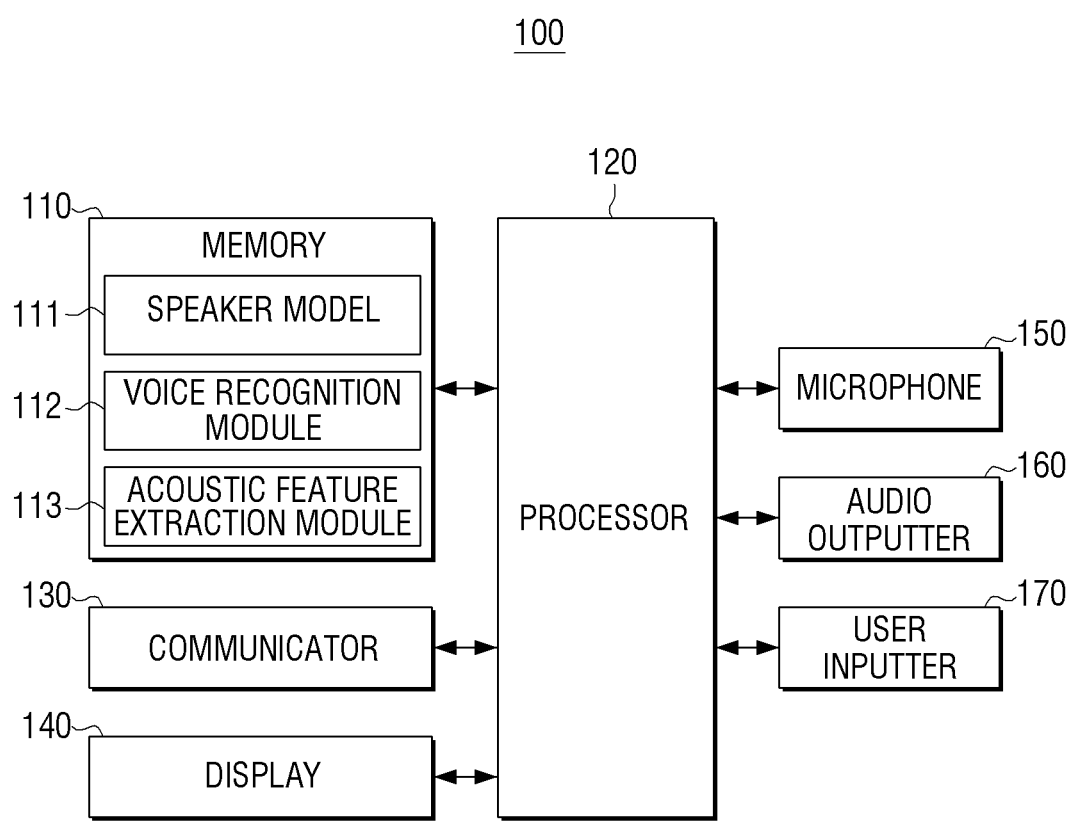
FIG. 3 is a block diagram illustrating in detail a configuration of an electronic device according to an embodiment of the disclosure.

FIG. 3 is a block diagram illustrating in detail a configuration of an electronic device according to an embodiment of the disclosure. As illustrated in FIG. 3, the electronic device 100 may include a memory 110, a communicator 130, a display 140, a microphone 150, an audio outputter 160, a user inputter 170, and a processor 120.

The memory 110 may be configured to store various programs and data necessary to the operation of the electronic device 100. The memory 110 may be implemented as a non-volatile memory, a volatile memory, a flash-memory, a hard disk drive (HDD), a solid state drive (SSD), or the like. The memory 110 may be accessed by the processor 120, and reading/writing/modifying/deleting/updating of data by the processor 120 may be performed. In the disclosure, the term 'memory' may include the memory 110, a read only memory (ROM; not shown) in the processor 120, a random access memory (RAM; not shown), or a memory card (not shown; e.g., a micro SD card, a memory stick) mounted to the electronic device 100.

In addition, the memory 110 may be configured to store the acoustic features of the first user voice and the speaker model including context information.

Further, the memory 110 may be configured to store a voice recognition module 112 for performing voice recognition on the first and second user voices and performing natural language processing, and an acoustic feature extraction module 113 for extracting the acoustic features of the first and second user voices.

The communicator 130 may be an element for the electronic device 100 to perform communication with the display device 200 or the external electronic device 300. The electronic device 100 may receive the user voice signal from the display device 200 or the external electronic device 300 through the communicator 130.

To this end, the communicator 130 may include various communication modules such as a wired communication module (not shown), a short range wireless communication module (not shown), and a wireless communication module (not shown).

Here, the wired communication module may refer to a module for performing communication with an external device (not shown) according to the wired communication methods such as wired Ethernet. Further, the short range wireless communication module may refer to a module for performing communication with an external device (not shown) located in short range according to the short range wireless communication methods such as Bluetooth (BT), Bluetooth Low Energy (BLE), and ZigBee method. In addition, the wireless communication module may refer to a module performing communication with an external device (not shown) and a voice recognition server (not shown) connected to an external network according to wireless communication protocols such as WiFi and IEEE. In addition thereto, the wireless communication module may further include a mobile communication module performing communication by connecting to a mobile communication network according to the various mobile communication standards such as 3rd Generation (3G), 3rd Generation Partnership Project (3GPP), Long Term Evolution (LTE), LTE Advanced (LTE-A), and 5th Generation Networks (5G Networks).

Meanwhile, the communicator 130 may be configured to perform communication with not only the display device 200 or the external electronic device 300, but also with a remote control device to control the display device 200 or the external electronic device 300. The remote control device may not only be a remote controller or a pointing device, but also a smartphone, a smartwatch, a tablet personal computer (PC), a PC, a notebook, or the like capable of controlling an external device by installing an application.

For example, the communicator 130 may be configured to perform communication with the remote control device (not shown) according to the short range communication methods such as Bluetooth or BLE, and transmit and receive various data.

According to another embodiment, the electronic device 100 may include an interface unit (not shown) configured to send and receive a video/audio signal by being connected with the display device 200 or the external electronic device 300. The interface unit may be configured to transmit/receive signals/data according to standards such as, for example, and without limitation, a display port (DM), a high definition multimedia interface (HDMI), HDMI-consumer electronics control (HDMI-CEC), a Red Green Blue (RGB) cable, a Universal Serial Bus (USB), a Digital Visual Interface (DVI), a Thunderbolt, a component, or the like, and may include at least one or more connectors or terminals corresponding to the respective standards thereof.

The display 140 may display image data processed in an image processor (not shown) in a display area (or, display). The display area may refer to at least a portion of the display 140 which is exposed at one surface of a housing of the electronic device 100. At least a portion of the display 140 may be coupled to at least one from among a front surface area and, a side surface area and a rear surface area of the electronic device 100 in the form of a flexible display. The flexible display may be twisted, bent or rolled without damage through a substrate which is thin and flexible like paper.

The microphone 150 may obtain the first and second user voices. Specifically, the microphone 150 may use a microphone to receive an external user voice, and process it to an electric voice data. In this case, the microphone 150 may send the processed voice data to the processor 120. The microphone 150 may be provided inside the electronic device 100, but this is merely one embodiment, and may be electrically connected with the electronic device 100 and provided externally. The audio outputter 160 may be a configuration for outputting not only various audio data to which various processing operations such as decoding, amplification, or noise filtering have been performed by the audio processor (not shown) but also various notification sounds or voice message. Specifically, the configuration of outputting audio may be implemented as a speaker, but this is merely one embodiment, and may be implemented as an output terminal capable of outputting audio data.

The user inputter 170 may be configured to receive various user inputs and send to the processor 120. The user inputter 170 may include, for example, a touch panel, a (digital) pen sensor, or a key. The touch panel may be configured to use at least one method from among, for example, a capacitive type, a resistive type, an infrared type, or an ultrasonic type. In addition, the touch panel may further include a control circuit. The touch panel may further include a tactile layer, and provide the user with a tactile response. The (digital) pen sensor may, for example, be a part of the touch panel, or may include a separate sheet for recognition. The key may include, for example, a physical button, an optical key, or a keypad.

The processor 120 (or, controller) may be configured to use the various programs stored in the memory 110 to control the overall operation of the electronic device 100.

The processor 120 may be comprised of a RAM (not shown), a ROM (not shown), a graphics processor (not shown), a main CPU (not shown), a 1st to nth interface (not shown), and a bus (not shown). The RAM (not shown), the ROM (not shown), the graphics processor (not shown), the main CPU (not shown), the 1st to nth interface (not shown), and the like may be interconnected through the bus (not shown).

Meanwhile, at least some from among the elements of the electronic device 100 illustrated in FIG. 3 may be omitted according to the embodiment of the electronic device 100.

For example, based on the electronic device 100 being implemented as a server as illustrated in FIGS. 1A and 1B, the display 140, the microphone 150, and the audio outputter 160 of FIG. 3 may be omitted in that the user voice is received in the external electronic device and the response on the user voice is also output from the external electronic device.

Figure 6:
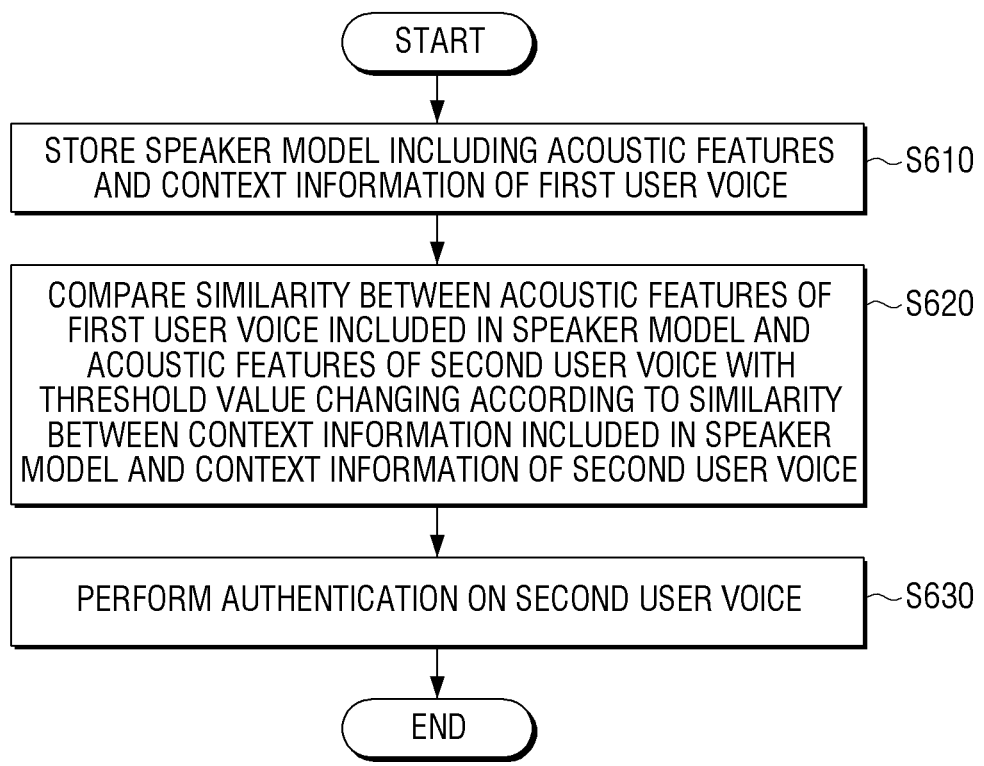
FIG. 6 is a flowchart illustrating a control method of an electronic device according to an embodiment of the disclosure.

FIG. 6 is a flowchart illustrating a control method of an electronic device according to an embodiment of the disclosure.

First, the electronic device 100 may be configured to store the speaker model including the acoustic features and the context information of the first user voice (S610).

Then, the electronic device 100 may be configured to compare the similarity between the acoustic features of the first user voice included in the speaker model and the acoustic features of the second user voice with the threshold value changing according to the similarity between the context information included in the speaker model and the context information of the second user voice (S620). Then, the authentication on the second user voice may be performed (S630).

Here, the threshold value may be identified to be proportionate to the similarity between the context information of the second user voice and the context information included in the speaker model.

Meanwhile, the electronic device 100 may be configured to calculate the threshold value based on the similarity between the context information of the second user voice and the context information included in the speaker model, and compare the calculated threshold value with the similarity between the acoustic features of the second user voice and the acoustic features of the first user voice stored in the speaker model.

At this time, the electronic device 100 may be configured to calculate the threshold value based on the maximum possible value of similarity between the first and second acoustic features based on the context information of the first user voice and the context information of the second user voice being the same.

Further, the electronic device 100 may be configured to identify that, based on the similarity between the acoustic features of the second user voice and the acoustic features of the first user voice stored in the speaker model being greater than or equal to the threshold value, the authentication on the second user voice is successful.

Meanwhile, the electronic device 100 may be configured to obtain, based on the first user voice being received, the acoustic features and the context information of the first user voice from the first user voice, and store the speaker model including the obtained acoustic features and the context information.

At this time, the electronic device 100 may be configured to select one context information type from among the pre-defined plurality of context information types.

Specifically, the electronic device 100 may be configured to identify the similarity between the acoustic features of the first user voice and the acoustic features of the respective test voices, the similarity between the context information of the first user voice and the context information of the respective test voices by type of the plurality of context information, and select the context information type in which the distribution of similarity of the acoustic features identified with respect to similarity between the identified context information satisfies a pre-set condition from among the plurality of context information types.

Then, the electronic device 100 may be configured to use the selected context information type to obtain the context information of the first user voice.

In addition, the electronic device 100 may be configured to analyze the second user voice, use the selected context information type to obtain the context information of the second user voice, and identify the threshold value based on the similarity between the context information of the second user voice and the context information included in the speaker model.

Meanwhile, the control method as described above may be implemented as a program including an executable algorithm capable of being executed in a computer, and the program may be stored and provided in a non-transitory computer readable medium.

The non-transitory computer readable medium may refer to a medium that stores data semi-permanently rather than storing data for a very short time, such as a register, a cache, a memory, or the like, and is readable by a device. Specifically, the above-described various applications or programs may be stored and provided in a non-transitory computer readable medium such as, for example, and without limitation, a compact disc (CD), a digital versatile disc (DVD), a hard disc, a Blu-ray disc, a USB, a memory card, a ROM, and the like.

While the disclosure has been illustrated and described with reference to the exemplary embodiments thereof, the disclosure is not limited to the embodiments specifically described, and it will be understood by those skilled in the art that various changes in form and details may be made therein without departing from the true spirit and full scope of the disclosure, including the appended claims and their equivalents.

[Industrial Applicability]

[List of Sequences Free Text]

What is claimed is:

1. An electronic device, comprising:
a microphone;
a memory configured to store a speaker model comprising acoustic features of a first user voice and context information comprising information on phoneme of the first user voice; and
a processor configured to:
based on a second user voice being input through the microphone, perform an authentication on the second user voice by comparing a similarity between acoustic features of the first user voice included in the speaker model and acoustic features of the second user voice with a threshold value determined to be proportional to a similarity between the context information included in the speaker model and context information of the second user voice, the context information of the second user voice comprising information on phoneme of the second user voice.

2. The electronic device of claim 1, wherein the processor is configured to calculate the threshold value based on a similarity between the context information of the second user voice and the context information included in the speaker model, and compare the calculated threshold value with a similarity between the acoustic features of the second user voice and the acoustic features of the first user voice stored in the speaker model.

3. The electronic device of claim 2, wherein the processor is configured to calculate the threshold value based on a maximum possible value of the similarity between the acoustic features of the first user voice and the acoustic features of the second user voice, based on the context information of the first user voice and the context information of the second user voice being the same.

4. The electronic device of claim 1, wherein the processor is configured to identify that, based on the similarity between the acoustic features of the second user voice and the acoustic features of the first user voice stored in the speaker model being greater than or equal to the threshold value, an authentication on the second user voice is successful.

5. The electronic device of claim 1, wherein the processor is configured to obtain, based on the first user voice being received, acoustic features and context information of the first user voice from the first user voice, and store the speaker model comprising the obtained acoustic features and context information in the memory.

6. The electronic device of claim 5, wherein the processor is configured to select one context information type from among a predefined plurality of context information types, use the selected context information type to obtain the context information of the first user voice, and store the obtained context information in the memory.

7. The electronic device of claim 6, wherein the processor is configured to:
   identify a similarity between the acoustic features of the first user voice and the acoustic features of respective plurality of test voices;
   identify a similarity between the context information of the first user voice and the context information of the respective plurality of test voices by types of the plurality of context information; and
   select, from among a plurality of context information types, a context information type in which a distribution of similarity of the determined acoustic features with respect to similarity between the identified context information satisfies a pre-set condition.

8. The electronic device of claim 6, wherein the processor is configured to analyze the second user voice, use the selected context information type to obtain context information of the second user voice, and identify the threshold value based on the similarity between the context information of the second user voice and the context information comprised in the speaker model.

9. A control method of an electronic device, the method comprising:
   obtaining a speaker model comprising acoustic features of a first user voice and context information comprising information on phoneme of the first user voice; and
   based on a second user voice being input, performing an authentication on the second user voice by comparing a similarity between acoustic features of the first user voice included in the speaker model and acoustic features of the second user voice with a threshold value determined to be proportional to a similarity between the context information included in the speaker model and context information of the second user voice, the context information of the second user voice comprising information on phoneme of the second user voice.

10. The method of claim 9, wherein the calculating comprises calculating the threshold value based on a maximum possible value of similarity between the acoustic features of the first user voice and the acoustic features of the second user voice based on context information of the first user voice and the context information of the second user voice being the same.

11. The method of claim 9, wherein the performing the authentication comprises identifying that, based on a similarity between acoustic features of the second user voice and acoustic features of the first user voice stored in the speaker model being greater than or equal to the threshold value, an authentication on the second user voice is successful.

12. The method of claim 9, further comprising:
   obtaining, based on the first user voice being received, acoustic features and context information of the first user voice from the first user voice; and
   storing the speaker model comprising the obtained acoustic features and context information.

13. The method of claim 12, wherein the obtaining comprises:
   selecting one context information type from among a pre-defined plurality of context information types; and
   using the selected context information type to obtain context information of the first user voice.

* * * * *